(No Model.)
H. F. GANON.
MATCH CABINET.
No. 591,215. Patented Oct. 5, 1897.
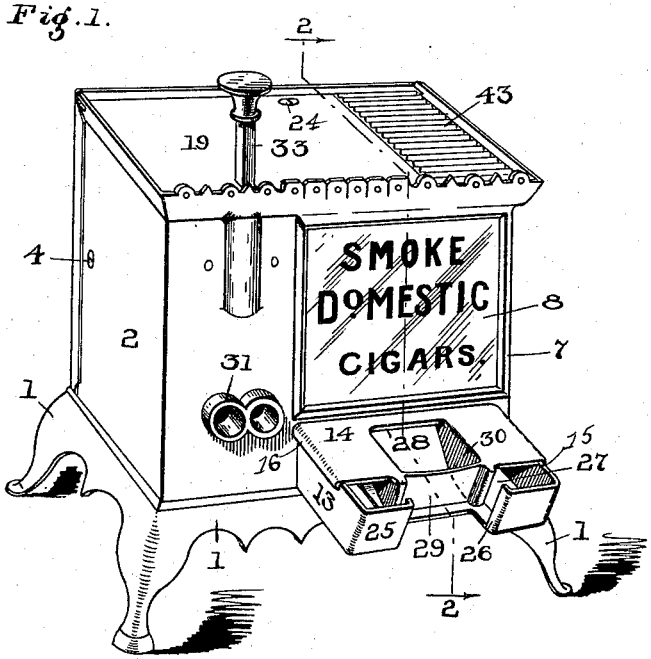
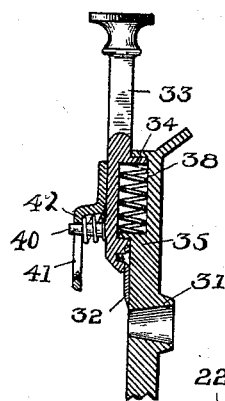
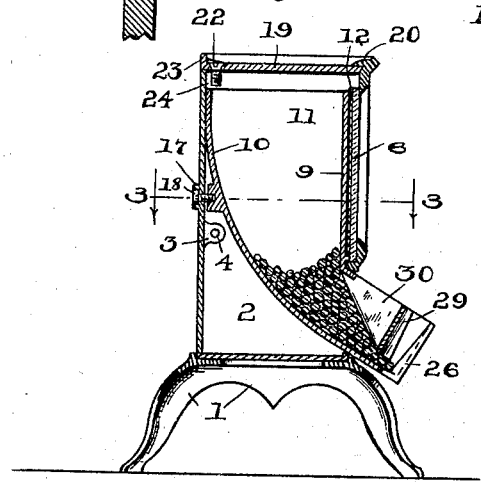
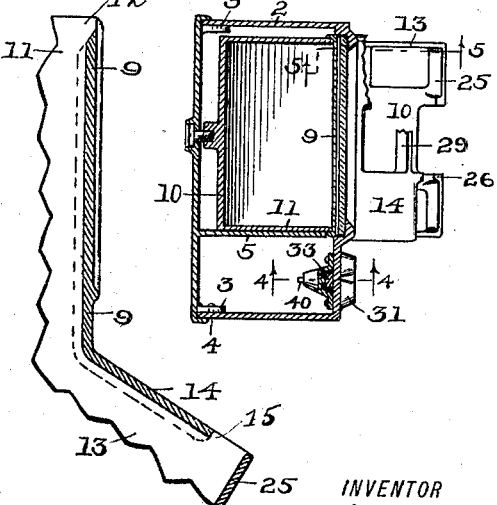
WITNESSES:
F. W. Woerner
Jula Green
INVENTOR
Henry F. Ganon
BY
W. H. Lockwood
His ATTORNEY.

UNITED STATES PATENT OFFICE.

HENRY F. GANON, OF INDIANAPOLIS, INDIANA.

MATCH-CABINET.

SPECIFICATION forming part of Letters Patent No. 591,215, dated October 5, 1897.

Application filed January 21, 1897. Serial No. 620,157. (No model.)

*To all whom it may concern:*

Be it known that I, HENRY F. GANON, of Indianapolis, county of Marion, and State of Indiana, have invented a certain new and useful Match-Cabinet; and I do hereby declare that the following is a full, clear, and exact description thereof, reference being had to the accompanying drawings, in which like figures refer to like parts.

This match-cabinet is adapted for use in cigar-stores and elsewhere, and comprises a suitable casing with a match-safe, a cigar-cutter, and an advertisement-receptacle therein.

One feature of my invention is the combination of the casing and match-safe whereby a receptacle for advertising-cards is provided, preferably in the front of the cabinet and over the part of the match-safe through which the matches are removed.

Another feature consists in the form and construction of the match-safe, whereby the matches can be removed only one at a time, will be held in the safe in an accessible position, and will not strike during their removal; and, finally, the combination of the parts in the manner shown substantially whereby a useful and practical article of the kind may be made I consider new.

The full nature of my invention will appear from the accompanying drawings and the description and claims following.

In the drawings, Figure 1 is a perspective of the match-cabinet. Fig. 2 is a vertical section on the line 2 2 of Fig. 1. Fig. 3 is a horizontal section on the line 3 3 of Fig. 2. Fig. 4 is a vertical section of a portion of the cabinet on the line 4 4 of Fig. 3. Fig. 5 is a detail of the joint between the two parts of the match-safe.

In detail, 1 is a suitable base-frame supporting the casing 2. The front and two ends of this are preferably formed integral and the back separate and having on it the perforated ears 3, (shown in Figs. 2 and 3,) whereby it is secured to the remainder of the frame by the bolts 4. A partial partition 5 is made integral with the back to separate the portion of the cabinet containing the match-safe and that containing the cigar-cutter, which forms a receptacle for the cigar-cuttings.

The front portion of the casing has a receptacle formed in it for an advertising-card 6. This is formed by cutting out a portion of the front and placing around it the bead or molding 7, that is integral with the casing. It holds the glass covering 8 and prevents its escape outward. The escape of the glass covering and advertising-card to the rear is prevented by the front plate 9 of the match-safe.

This match-safe is formed by this separable front plate 9 and the main body of the match-safe 10. The rear of the match-safe is curved to the front at its lower end, as shown in Fig. 2, so that the matches will by gravity be drawn down to the front end, from which they are removed. The side walls 11 of the match-safe have a portion of their front edge that is vertical, with a slight projecting point or lug 12 at the upper end, as seen in Figs. 2 and 5, and an inclined outwardly-extended portion 13 at the lower end, as seen in Fig. 1. The front plate 9 of the match-safe has also an inclined lower extended plate 14, that rests on a seat cut in the upper edges of the extension 13 of the main part of the safe, being held from downward movement by the points 15, as seen in Figs. 1 and 5. Between the point 12 and the extension 13 the front plate snugly fits, as seen in Fig. 5, and it has on its lateral edges the bead 16, to prevent lateral movement. (Shown in Fig. 1 and in dotted lines in Fig. 5.)

When the two parts of the match-safe are placed together, they are then placed in the casing with the forward extension of the match-safe extending through a suitable opening in the lower part of the casing. On the rear face, about centrally, of the match-case I provide a bearing-lug 17, against which the screw 18 bears, that extends through the rear side of the casing. By this screw 18 I force the match-safe against the front of the casing, thus holding the front plate of the match-safe in place, forming a receptacle for the glass plate and advertising-card in the front part of the casing between the bead 7 on the outside and the front plate 9 of the match-safe on the inside.

The lid 19 rests upon a suitable ledge formed on the upper part of the walls of the casing. Its front end is held down by the lug 20, formed on the front part of the casing integral therewith, and under which the lid 19 slips. To prevent the upward movement of the rear portion of the lid, I have at each end of it a slight extension 22, that enters a horizontal slot in the upper rear corners of the sides of the casing. An upwardly-extending flange 23 fits against the sides of the casing as a stop. Said lid is removed by sliding it backward, and it is prevented from such movement by the screw 24 passing through it and extending somewhat into the casing. In this construction it is observed that the advertising-card can be changed in a minute by releasing the screw and sliding the lid back somewhat, so that access can be had to the card, and yet when said card is in place it cannot be removed by unfriendly persons without unscrewing the screw 24.

The portion of the match-safe from which the matches are removed one at a time is formed as follows: The lower part or extension 13 has the two front walls 25, that have ample finger-space between them. Their ends are turned in, so as to form the extension 26. In the bottom of the extended portion of the match-safe there are two cut-out portions 27, as shown in Figs. 1 and 3, one on each side of the match-safe. These are to permit the escape of matches that do not go in the safe horizontally. If matches enter the match-safe vertically, they will slip out of these openings at the lower ends. The central portion of the bottom of the match-safe is also cut out, as shown in Figs. 1 and 2, preferably about the width of a match. Cooperating with the parts which I have mentioned the extension 14 of the front part of the match-safe has an opening 28 centrally located for the purpose of inserting the finger and moving the matches down or straightening them, if desired. Across the front of this opening 28 and at the central part of the match-safe I provide a plate 29. The purpose of this is to prevent the removal of more than one match at a time. It extends downward far enough to leave an opening between it and the bottom of the match-safe large enough for the passage of one match only. The side pieces 30, as seen in Figs. 1 and 2, tend to direct the matches down to the exit. The front end of each of these side pieces 30 is provided with a ridge, bead, or extension that registers with the extension or bead 26, heretofore mentioned. The border about the base-frame 1 is cut away beneath the removal-opening from the match-safe, as seen in Fig. 2, to permit the extension of the finger under the front part of the match-safe for grasping a match. These beads or extensions 26 and 31 are separated sufficiently to permit the passage of one match only. Another chief object is to prevent the striking of the matches in their removal. It is observed that the body of the matches during their removal will constantly engage one or the other of these beads or extensions, and therefore the heads will not contact with the front portions 25 of the match-safe or with the forward edge of the extension 14, and because of the openings 27 the heads cannot engage with anything on the bottom, so the matches are, during the handling of them in the safe and their removal, protected from striking. It is observed that the removal portion of the match-safe is under the receptacle for the advertising-card.

In the front wall of the casing 2 I provide openings 31 for the insertion of the ends of cigars to be cut by the knife 32, that is secured to the plunger 33, which extends up through an opening in the lid 19 and has on its upper end a knob. On said plunger, about midway, there is a forwardly-extending lug 34, that registers with the rearwardly-extending lug 35 on the front wall of the casing 2. Between these two lugs 34 and 35 there is a groove 36 in the front wall of the casing and a corresponding recess 37 in the plunger, forming a barrel to receive a spiral spring 38, whereby the plunger is held in an upward position.

The lower portion of the plunger is guided by a bracket 39, that envelops it, which is secured to the front wall of the casing 2, as seen in Fig. 1. In order to hold the cutting-knife 32 against the front wall of the casing to make a clean cut, I provide on the lower end of the plunger a horizontal rod 40, that extends through a slot in the downwardly-extending arm 41 from the bracket 39. Around the rod 40 I coil a spiral spring 42. On the lid of my match-cabinet I place a scratching-surface 43.

What I claim as my invention, and desire to secure by Letters Patent, is—

1. In a match-cabinet, the casing with an opening therein to receive an advertising-card, a bead about such opening to prevent the escape of such card to the front, and a match-safe inserted within such casing with its front wall arranged to close said opening at the back, and an adjusting-screw to press the front of said match-safe against the front wall of the casing.

2. In a match-cabinet, a receptacle for matches provided with an inclined forward extension with a vertical passage-way from the lower portion of such extension, said passage-way being provided on either side with beads or extensions to prevent the heads of the matches engaging with the walls of the extension on each side, and central openings in the top and bottom of such extension with a web or plate extending across the front of the upper opening and down sufficiently near the bottom of the extension to leave a passageway for a match.

3. A match-cabinet comprising a casing with an opening in its lower end, a match-safe that is inserted in said casing and has an inclined forward lower extension through the opening in the casing, a sliding lid for said casing, lugs to prevent the upward movement of said lid, and a screw extending through the lid into the casing to prevent the horizontal movement thereof.

In witness whereof I have hereunto set my hand this 8th day of January, 1897.

HENRY F. GANON.

Witnesses:
V. H. LOCKWOOD,
ZULA GREEN.